SAMPLED FREQUENCY MODULATION

Filed June 4, 1962 3 Sheets-Sheet 1

INVENTOR
S. DARLINGTON
BY Harry C. Hart
ATTORNEY

INVENTOR
S. DARLINGTON
BY Harry C. Hart
ATTORNEY

SAMPLED FREQUENCY MODULATION

Filed June 4, 1962

INVENTOR
S. DARLINGTON
BY Harry C. Hart
ATTORNEY

United States Patent Office 3,299,357

Patented Jan. 17, 1967

3,299,357

SAMPLED FREQUENCY MODULATION

Sidney Darlington, Passaic Township, Morris County, N.J., assignor to Bell Telephone Laboratories, Incorporated, New York, N.Y., a corporation of New York Filed June 4, 1962, Ser. No. 199,854
8 Claims. (Cl. 325—349)

This invention relates to the transfer of information in the presence of noise, particularly with signaling power below the average level of disturbance power.

In order for information to be transferred without substantial error, a minimum of signaling power is required; otherwise, noise, e.g., additive disturbances, will dominate the transfer and cause excessive distortion effects. The power level required for satisfactory signaling depends in part upon the way in which the information is applied to a carrier wave. Up to a point, when the information is applied by changing, i.e., modulating, the frequency of the carrier, the required power level is reduced as the frequency of the carrier is caused to deviate over a wider range. Of course, an increased frequency deviation is accompanied by an even greater increase in required bandwith. Nevertheless, the attendant reduction in signaling level is particularly desirable in long range systems where the amount of signaling power is limited.

Unfortunately, the exchange between bandwidth and signaling power afforded by frequency modulation cannot be continued indefinitely. When a demodulator used to recover the transmitted information responds primarily to noise rather than to the information, it is said to be blocked. As the amplitude, and hence the power, of a frequency modulated carrier is reduced, a threshold is attained beyond when blocking occurs too frequently to be tolerated.

Accordingly, it is an object of the invention to facilitate the transfer of information by a frequency modulated carrier of low power in the presence of noise having sufficient power to cause excessive blocking of an ordinary frequency demodulator. A related object is to lower the blocking threshold associated with the demodulation of frequency modulated waves.

Of course, there are other considerations besides the threshold level of a demodulator. Since noise disturbances are random, they have low power, as well as high power, intervals. Hence it is not surprising that a demodulator with a lower threshold than other, i.e., better response during high power intervals, may not respond as well when the noise level is low and vice versa. Or, a demodulator designed to cope with the full range of noise effects may be subject to system difficulties. This is the case where feedback is introduced to reduce the blocking threshold for high power noise disturbances while maintaining a capability for dealing with low power noise disturbances as well. Accompanying the introduction of feedback are circuit instabilities which become of increasing consequence with low levels of signaling power requiring appreciable feedback.

Therefore, it is a further object of the invention to lower the blocking threshold of a demodulator without sacrificing its facility for dealing with low power noise disturbances and vice versa. An associated object is to recover the information carried by a frequency-modulated wave of low power level without being subject to the detrimental instabilities that accompany the use of feedback.

To accomplish the foregoing and related objects, the invention employs sampled frequency modulation in which successive information wave samples control the frequency of a carrier. Typically, each succeeding sample adjoins the preceding one and has a constant amplitude over its interval. Then, during a sample interval, the frequency of the generated carrier is substantially constant at a magnitude determined by the sample amplitude.

However, in the course of transmission the frequency of the carrier undergoes considerable variation during each sample interval because of noise effects. Consequently, when the noise power is appreciable, for example, exceeding that of the carrier, it becomes difficult to recover the information wave at a receiver by conventional techniques. Nevertheless, according to the invention, the threshold of the receiver for high-power noise effects is lowered beyond that normally obtaining in conventional frequency demodulation. This is accomplished through the use of an analyzer which distributes the power of the incoming wave over a substantial number of narrow-band frequency intervals. As a result, the high-power noise effects accompanying the incoming wave are converted into low-power noise effects in each narrow-band frequency interval. Consequently, as long as the power in the narrow-band interval containing the signaling energy exceeds the average disturbance power in any of the other narrow-band intervals, the maximum spectral component determined by the analyzer during a sample interval is closely that of the signaling energy. Once determined, each maximum spectral component is converted into the sample corresponding to it, so that the information wave samples are thus reconstituted.

Of course, the reconstituted wave departs slightly from its originally generated counterpart because of the low-power noise effects in the narrow-band frequency intervals containing the maximum spectral components. The extent of the departure depends upon whether the analyzer relies upon phase, as well as frequency, information. To simplify synchronization requirements, the analyzer is typically one for which phase information is unnecessary, i.e., the analyzer is phase-independent. Then, because of the low-power disturbance effects, a residual error arises exceeding that accompanying conventional frequency demodulation. Nevertheless, in keeping with the invention, a measure of the excess error is provided by an error reduction network. For one kind of error-reduction network an error signal is obtained by mixing the incoming modulated wave with a local carrier whose frequency is controlled by the reconstituted samples. Subsequently, the error signal is frequently-demodulated and used to compensate the reconstituted samples.

A phase-independent analyzer is able to take various forms. It can be a pulse compressor employing a local sweep frequency generator in conjunction with a dispersive line and a pulse-position demodulator. Or, it can be constituted of a bank of filters or a bank of weighted-integrators operating in conjunction with a converter that selects the spectral component of maximum magnitude. With weighted-integrators, two are required for each frequency to be analyzed in order to eliminate a phase sensitivity that would otherwise exist.

Where the phase characteristic of the received signal is known, the analyzer can be phase-dependent and the error-reduction network is not needed. Then, for example, in the case of a bank of weighted-integrators, only one is required for each frequency to be analyzed. It is adjusted to compensate for the known or measured phase shift. However, a phase-dependent analyzer requires a higher degree of synchronization than does one that is phase-independent.

Other aspects of the invention will become apparent after a consideration of several of its illustrative embodiments, taken in conjunction with the drawings in which.

Figure 1:
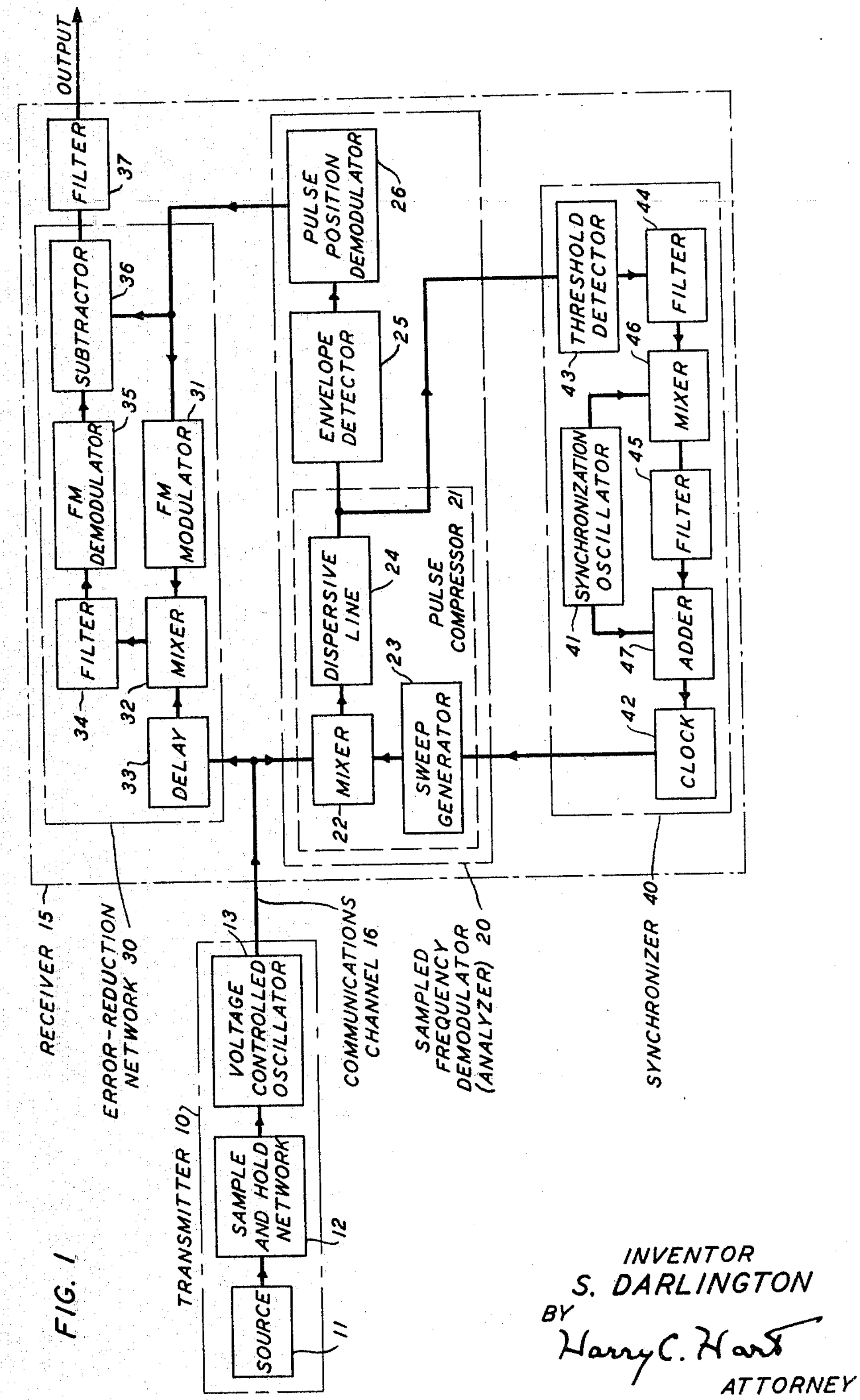
FIG. 1 is a block diagram of a sampled frequency modulation system according to the invention.
Figure 2:
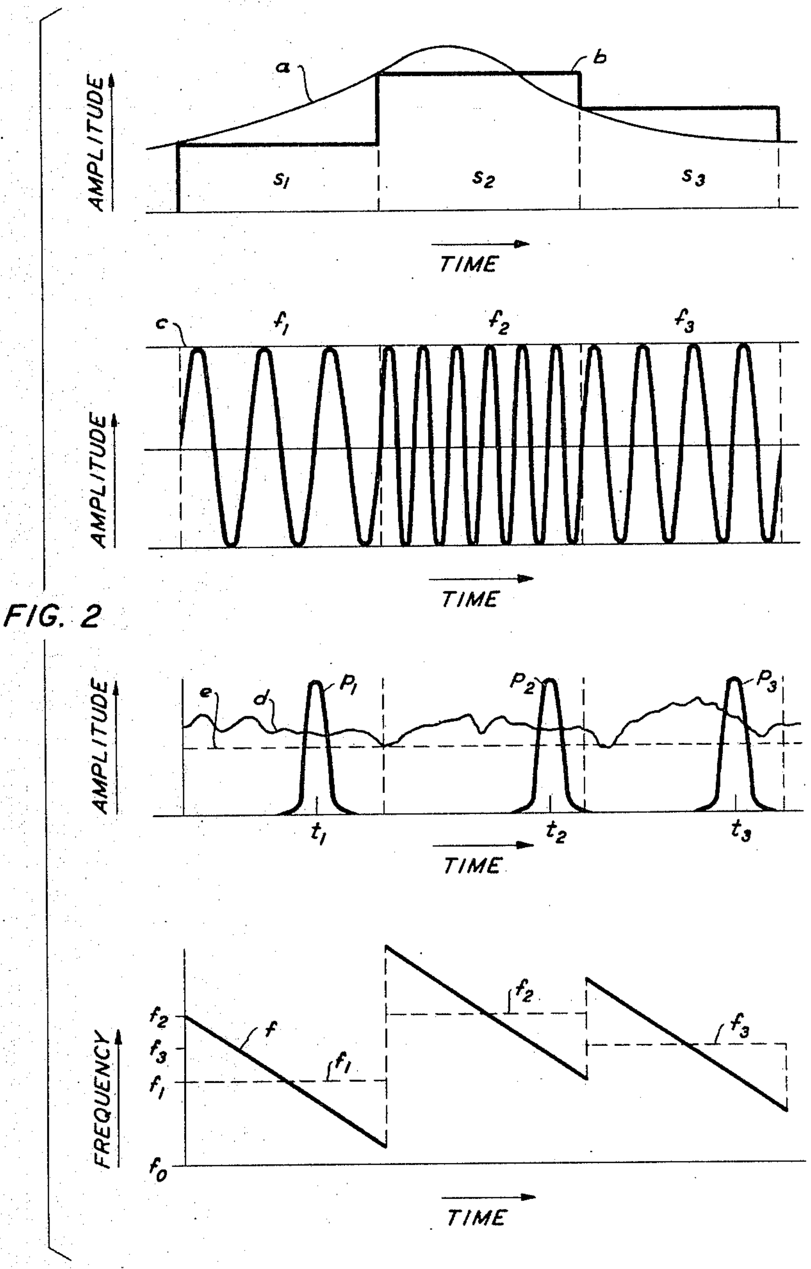
FIG. 2 is a set of waveforms for the system of FIG. 1.

Turning now to the drawings, consider the sampled frequency modulation system of FIG. 1 and the waveforms of FIG. 2. At a transmitter 10 an information wave *a*, originating at a source 11, is converted by a conventional sample-and-hold network 12, operating at the Nyquist rate, into its staircase counterpart *b*. The staircase wave *b* consists of a sequence of samples $s_1$, $s_2$, and $s_3$ of the information wave *a*. These samples act upon a voltage-tuned oscillator 13 to produce a sampled frequency modulated wave *c* whose frequencies $f_1$, $f_2$ and $f_3$ are substantially uniform during successive sample intervals, as determined by the amplitudes of the corresponding samples $s_1$, $s_2$, and $s_3$. When no sample is applied to the oscillator 13, it operates at its base frequency $f_0$.

In order to permit a significant exchange of signaling level for bandwidth, the modulation index and, consequently, the frequency deviation of the modulated wave are appreciable. For example, with an information-bearing wave having a maximum bandwidth of five megacycles per second, the modulation index is on the order of 20 so that bandwidth of the modulated wave is about 20 times that of the information wave, namely, about 100 megacycles.

Upon arrival at a receiver 15 by way of a communication channel 16, the incoming modulated wave *d* (FIG. 2), as attenuated during transmission and altered over and above it attenuation level *e* channel noise, is applied to a sampled frequency demodulator 20 (FIG. 1) which allows reconstitution of the originally processed information wave with a high degree of accuracy.

In essence, the demodulator 20 is a wide band analyzer that determines the frequencies associated with the successive sample intervals of the modulated wave. Although the spectrum of the analyzer embraces the entire frequency range of the modulated wave, it does so over a succession of narrow-band frequency intervals. Hence, the total disturbance power is distributed among all the intervals while the signaling power is substantially confined to only one of them. Thus, as long as the signal power exceeds the average disturbance power in one interval, the analyzer 20 is less likely to be affected by occasional disturbance peaks that block operation than would a conventional frequency demodulator.

To simplify synchronization requirements, the analyzer 20 desirably does not require phase information and it is said to be phase independent. One such analyzer is included in FIG. 1. It includes a pulse compressor 21 employing compression techniques of the kind disclosed in Patent 2,678,997 issued to S. Darlington on May 8, 1954. Accordingly, the oscillatory energy in a sample interval is converted into a compressed pulse $p_1$, $p_2$ or $p_3$ (FIG. 2) at a position, within its interval, indicative of the oscillatory frequency during that interval. By virtue of the compression the oscillatory energy over the interval is confined to a much narrower interval, causing the resultant pulse $p_1$, $p_2$ or $p_3$ to rise above the disturbance level of the incoming wave *d*.

As a preliminary to compression, the incoming modulated wave is multiplied in a mixer 22 by the output of a synchronized sweep-frequency generator 23. During each sample interval the frequency of the generator is swept linearly above and below the quiescent frequency $f_0$ of the voltage-controlled oscillator at the transmitter. Consequently, the output of the mixer has a sawtooth frequency variation *f* (FIG. 2). Compression is achieved by applying the sweep-supplemented wave to a dispersive line 24; i.e., an all-pass network with either zero or constant loss, but with a phase delay that varies linearly over the frequency band of the swept wave. Because the supplemented wave is variable in frequency over the sample interval, its various frequency components are delayed by different amounts during passage through the line. When the delay is appropriately adjusted, the components that were initially stretched linearly over the sample interval are accrued, i.e., reach the output of the line, at a time position $t_1$, $t_2$, or $t_3$ determined substantially by the center frequency $f_1$, $f_2$, or $f_3$ of the supplemented wave. Hence the peak amplitude of each compressed pulse corresponds to a maximum spectral component of the incoming wave. Consequently, a conventional envelope detector 25, acting as a selector, and a conventional pulse-position demodulator 26 can be used to reconstitute the various samples of the information wave.

Although the output of the demodulator 20 in FIG. 1 has a desirable threshold behavior relative to over-all high-power disturbances, its performance with respect to lower-power disturbances in the vicinity of each principal spectral component is less satisfactory by about six decibels than that of a conventional frequency demodulator. Nevertheless, with an error-reduction network 30, the final output of the receiver 15 can be made equivalent to that obtained with conventional frequency demodulation without detriment to the threshold advantage of sampled frequency modulation by using a phase-independent analyzer.

In the error-reduction network 30 (FIG. 1) the reconstituted information wave samples are applied to a frequency modulator 31. The resultant frequency modulated wave is multiplied in a mixer 32 with the incoming wave, as appropriately retarded by a delay network 33. Through the use of a narrow-band filter 34 a difference frequency wave is selected which is frequency modulated according to the low-power noise error present in the output of the sampled frequency demodulator 20. Because the frequency modulation corresponding to the low-power noise error is small compared with the frequency deviation of the incoming wave, the bandwidth of the narrow band filter 34 need be only a fraction of the bandwidth of the incoming wave *d*, with an attendant decrease in the noise level. Subsequently, when the difference frequency wave is, in turn, applied to a conventional frequency demodulator 35, the amplitude of the low-power noise error is supplemented by an error component attributable to conventional frequency demodulation. Hence, when the supplemented error amplitude is subtracted in a subtractor 36 from the reconstituted wave samples, the resultant wave samples are left with only the error component that attends conventional frequency demodulation. The output of the error-reduction network 30 is thereafter smoothed by a filter 37 to produce the receiver counterpart of the original information wave *a* (FIG. 2).

Consider further the example of a 5 megacycle information wave converted into a 100 megacycle sampled frequency-modulated wave. The blocking threshold of the demodulator is conveniently expressed as the ratio of signal power to the noise power in a frequency interval equal to the bandwidth of the information wave. This is because, with an information wave of fixed bandwidth, the threshold changes but slowly as the index of modulation changes. In this example the ratio can be as low as 15 or 16 decibels, in which case the signal power is only about 3 decibels above the noise power in the bandwidth of the modulated wave. Even so, sampled frequency modulation permits the recovered information wave to have a signal-to-noise power ratio typically exceeding 40 decibels.

There are numerous ways of synchronizing the receiver 15 with the transmitter 10 to assure that the demodulator 20 operates at appropriate times. For the synchronizer 40 of FIG. 1, a low-frequency sinusoid from a synchronization oscillator 41 is superimposed upon the output of a clock 42 that controls the sweep generator 23 of the analyzer. In addition, the output from the dispersive line 24 in the analyzer is passed through a threshold detector 43 where it is rectified and averaged over many samples to produce, in conjunction with a filter 44, an output that is proportionate to the amount by which the threshold is exceeded. If the synchronization is incorrect, fluctuations will appear in the output of a filter 45 that is energized from a mixer 46 which, in turn, is fed by the synchronization oscillator 41 and the filter 44. The fluctuations are applied, along with the output of the synchronization oscillator 41, through an adder 47, to the clock 42 to adjust its phase.

An alternative way (not illustrated) of synchronizing the receiver relies upon a reference sine wave, generated at the transmitter and there used to amplitude-modulate a carrier in the spectral band of the sampled frequency-modulated wave. At the receiver the reference signal is recovered with a narrow-band filter and used to control the clock which acts upon the demodulator.

Figure 3:
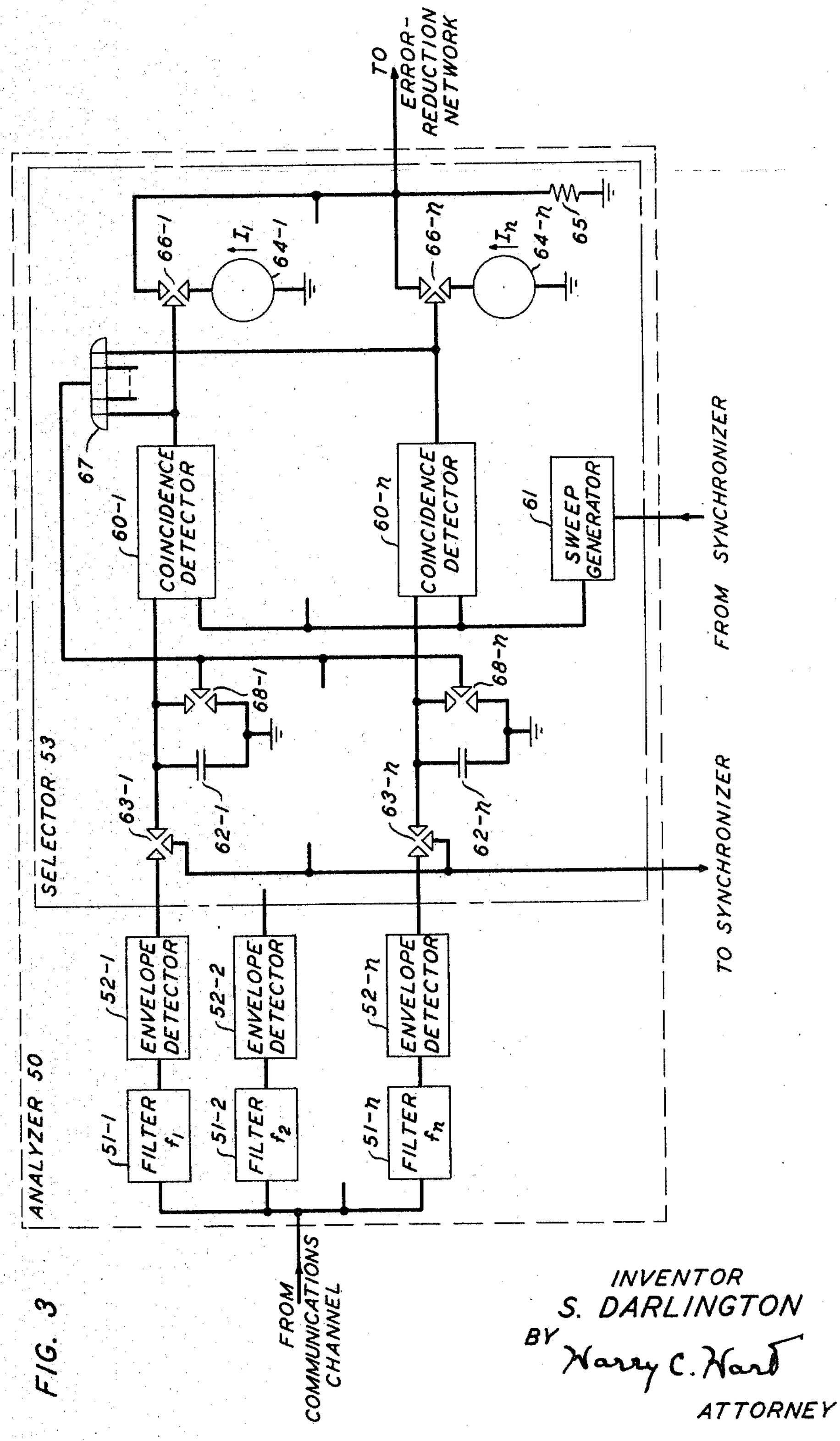
FIG. 3 is a block diagram of an alternative sampled frequency demodulator for the system of FIG. 1.

Another appropriate analyzer 50 for the system of FIG. 1 is shown in FIG. 3. It includes a bank of filters 51–1 through 51–*n*, each having a narrow-band frequency interval centered about a selected one of the discrete frequencies, which may appear in the sampled frequency-modulated wave. The output of each filter 51 enters an envelope detector 52 of conventional construction. During each recurrent sample interval, the collective outputs of the detectors 52–1 through 52–*n* are examined by a selector 53 to determine the envelope of maximum magnitude and, from the determination, to reconstitute the information wave. The selector 53 is timed by the synchronizer 40 (FIG. 1) to allow a suitable buildup of filter response. Typically, the bandpass interval of each filter 51 is proportioned so that the build-up time is approximately the sample interval.

A suitable selector for the analyzer 50 of FIG. 3 takes the form of a coincidence detector 60 for each filter 51 and a sweep-voltage generator 61 which ranges downward from the maximum anticipated envelope amplitude. The first coicidence of a sweep amplitude with that of a filtered output stored on one of the selector capacitors 62–1 through 62–*n* determines the desired spectral component. Storage is effected when normally open switches 63–1 through 63–*n* are momentarily operated during a sample interval by the synchronizer 40 (FIG. 1). Once frequency appropriate to a sample interval has been selected, that frequency determines the amplitude of a reconstituted sample. This is accomplished with a bank of current sources 64–1 through 64–*n* whose associated coincidence detectors 60–1 through 60–*n* determine the level of the current passing through an output resistor 65. For each sample the first coincidence detector 60 to respond closes a normally open switch 66, allowing an appropriate magnitude of current to flow in the output resistor 65. The selector also includes an OR gate 67 operated by the coincidence detectors 60–1 through 60–*n*. The OR gate 67 prepares the selector for an ensuing cycle of operation by closing normally open switches 68–1 through 68–*n* to discharge the capacitors 62–1 through 62–*n*.

Instead of the filter bank of FIG. 3, the analyzer may be of the Fourier type disclosed in the copending application of H. B. Andrew, Serial Number 165,068, filed January 5, 1962, now issued as Patent 3,217,251, November 9, 1965, except that the sweep frequency arrangement in Andrew is replaced by a pair of weighted-integrators for each filter 51 in FIG. 3. Each weighted-integrator multiplies the incoming pulsed frequency modulated wave by a weight factor, which is a sinusoidal function of a selected frequency. The multiplied wave is next integrated over a sample interval. Two weighted-integrators are required for each frequency because of the phase shift encountered by the incoming modulated wave during its traversal of a communications channel. One of the weighted-integrators in the pair is adjusted to have a phase shift of zero, while the other is adjusted to have a complementary phase shift of 90 degrees. Consequently, an envelope, corresponding to that obtained with the envelope detectors of FIG. 3, is produced by extracting the square root of the sums of the squares of individual weighted-integrator outputs.

Where the phase shift imparted to the modulated wave by the channel is known, the analyzer can be phase-dependent and the reconstituted wave is applied directly to the output filter 37 (FIG. 1). Then only a single weighted-integrator, adjusted for phase shift, is required for each frequency. Other kinds of analyzers, which are either phase-dependent or phase-independent employ quadrature channel pairs, filters as convolution operators and filters with phase discriminators.

Still other adaptations and modifications of the invention will occur to those skilled in the art.

What is claimed is:

1. Apparatus for recovering successive and adjoining information samples from an incoming signal wave whose frequency is controlled by the amplitudes of the samples and whose transmission takes place in the presence of noise, which comprises means for selecting, during each successive sample interval, the maximum spectral component of the incoming frequency-controlled wave.

means for converting successive ones of the maximum spectral components into corresponding amplitude levels, thereby to reconstitute the successive samples despite the disturbances but subject to residual error, and means for compensating said residual error comprising means for generating a wave whose frequency is controlled by the reconstituted samples, means for developing a wave whose frequency is the difference between that of the generated wave and that of said incoming signal wave, and means for correcting the reconstituted samples by the amplitude-varying counterpart of the difference frequency wave.

2. Apparatus for demodulating a signal wave that has been frequency modulated by a staircase information wave, which comprises means for analyzing the frequency spectrum of the modulated signal wave, means for selecting, during each step interval of the staircase, the maximum frequency component of the analyzed wave, and means for converting each maximum component into an amplitude step counterpart, thereby to substantially recover the staircase information wave.

3. Apparatus as defined in claim 2 further including means for compensating a residual error in the recovered staircase information wave.

4. Apparatus for demodulating an incoming wave whose frequency is changed substantially discontinuously by an amount proportional to the amplitude difference between successive samples of an information wave, which comprises, heterodyne means for supplementing said incoming wave by a sweep frequency over each sample interval, dispersive means for accruing the frequency components of the swept wave at a time position during said sample interval indicative of the incoming wave frequency, means responsive to said accrued frequency components of the swept wave for synchronizing said heterodyne means, means for determining the time position of said accrued frequency components, and means for deriving an information wave sample whose amplitude is governed by said time position.

5. Apparatus for recovering successive and adjoining information wave samples from an incoming carrier wave whose disturbance power exceeds its signaling power, the carrier wave having been generated over the interval of each sample with a substantially constant frequency determined by the amplitude of the sample, which comprises means for distributing, during each sample interval, the power of said carrier wave over a plurality of narrow-band frequency intervals, only one of which substantially contains the signaling power, means for selecting the maximum spectral component of said narrow-band frequency intervals, and means for converting the selected spectral component into a sample of constant amplitude determined by its frequency.

6. Apparatus as defined in claim 5 further including means for compensating the error in the recovered sample attributable to the disturbance power contained in the narrow-band frequency interval of said principal spectral component.

7. A communication system comprising means for generating a carrier wave whose frequency is controlled by successive information wave samples, means for distributing the energy of said carrier wave over a plurality of narrow-band frequency intervals over the duration of each wave sample, means for detecting the frequency interval of maximum energy during said duration of said wave sample, and means responsive to the detecting means for reconstituting said wave samples.

8. A communication system comprising a source of signals, means for deriving samples from the signals of said source, means for generating a wave whose frequency is controlled by said samples, means for sweeping the frequency of said wave for each of said samples, means for dispersing the frequency constituents of the frequency-swept wave, and means for detecting the dispersed constituents of said frequency-swept wave.

References Cited by the Examiner

UNITED STATES PATENTS

| | | | |
|---|---|---|---|
| 2,708,268 | 5/1955 | Toulon | 179—15 |
| 2,954,465 | 9/1960 | White | 325—432 X |
| 2,957,943 | 10/1960 | Rack | 325—38 |
| 2,972,720 | 2/1961 | Hume | 331—4 |
| 3,008,087 | 11/1961 | Darwin | 328—72 |
| 3,090,922 | 5/1963 | Diggelmann | 328—72 |
| 3,110,861 | 11/1963 | Hurvitz | 324—77 |
| 3,125,723 | 3/1964 | Spogen et al. | 325—38 |
| 3,142,022 | 7/1964 | Gray et al. | 331—4 |
| 3,154,782 | 10/1964 | Kagawa et al. | 325—138 X |
| 3,156,867 | 11/1964 | Whitwell et al. | 324—77 |
| 3,165,741 | 1/1965 | Thor | 179—15 X |
| 3,216,013 | 11/1965 | Thor | 343—17.2 |

JOHN W. CALDWELL, *Primary Examiner.*

E. C. MULCAHY, Jr., *Examiner.*